(12) United States Patent
Ghoshal

(10) Patent No.: US 6,661,303 B1
(45) Date of Patent: Dec. 9, 2003

(54) CROSS TALK SUPPRESSION IN A BIDIRECTIONAL BUS

(75) Inventor: Uttam Shyamalindu Ghoshal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/451,956

(22) Filed: Nov. 30, 1999

(51) Int. Cl.[7] ................................................ H04B 3/32
(52) U.S. Cl. ............................. 333/1; 333/12; 327/551
(58) Field of Search ...................... 333/1, 12; 327/551, 327/311

(56) References Cited

U.S. PATENT DOCUMENTS 5,027,088 A * 6/1991 Shimuzu et al. ............... 333/1
6,008,705 A * 12/1999 Goshal ........................... 331/1

* cited by examiner

Primary Examiner—Dinh T. Le
(74) Attorney, Agent, or Firm—Joseph P. Lally; Casimer K. Salys

(57) ABSTRACT

A bidirectional bus and data processing system suitable for suppressing cross talk noise are disclosed. The bidirectional bus includes, a first interconnect line driven by a pair of drivers, a first pair of impedance elements connected between the first line and a second line of the bus, and a second pair of impedance elements connected between the first line and a third line of the bus. In one embodiment, the capacitive coupling per unit length between the first line and the second line is approximately equal to k and the impedance of the first pair of impedance elements is approximately equal to $(\upsilon k)^{-1}$, where $\upsilon$ is the speed of light through a dielectric in which the first and second lines are located. In one embodiment, the impedance of the first driver is approximately equal to $(\upsilon c_0)^{-1}$, wherein $c_0$ is the self-capacitance of the first line.

22 Claims, 3 Drawing Sheets

$$C = \begin{bmatrix} c & -k & 0 & 0 & \ldots & 0 \\ -k & c & -k & 0 & \ldots & 0 \\ 0 & -k & c & -k & \ldots & 0 \\ 0 & 0 & -k & c & \ldots & 0 \\ 0 & 0 & 0 & -k & \ldots & 0 \\ \vdots & \vdots & \vdots & \vdots & \ldots & \vdots \end{bmatrix}$$ FIG 4

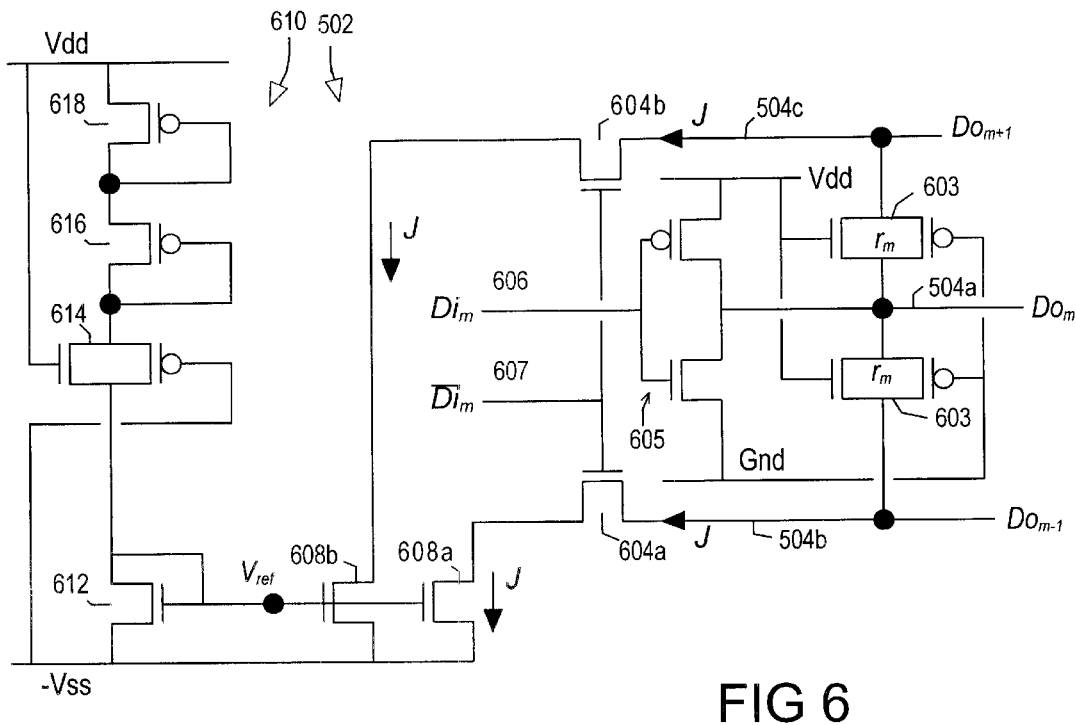

FIG 6

$$\begin{bmatrix} 0 \\ \vdots \\ 0 \\ J_I \\ J_O \\ 0 \\ \vdots \\ 0 \end{bmatrix} = \frac{\upsilon}{2} \begin{bmatrix} \cdots & \cdots & \cdots & \cdots & \cdots & \cdots & \cdots \\ \cdots & c & -k & 0 & \cdots & \cdots & \cdots \\ 0 & -k & c & -k & 0 & \cdots & \cdots \\ \cdots & 0 & -k & c & -k & 0 & \cdots \\ \cdots & \cdots & 0 & -k & c & -k & \cdots \\ \cdots & \cdots & \cdots & 0 & -k & c & \cdots \\ \cdots & \cdots & \cdots & \cdots & \cdots & \cdots & \cdots \end{bmatrix} \begin{bmatrix} 0 \\ \vdots \\ 0 \\ 0 \\ V_s \\ 0 \\ 0 \\ \vdots \\ 0 \end{bmatrix}$$

FIG 3C

CROSS TALK SUPPRESSION IN A BIDIRECTIONAL BUS

RELATED APPLICATION

The subject matter disclosed herein is related to the subject matter disclosed in a U.S. patent application entitled Crosstalk Suppression in Wide, High-Speed Buses, (Ser. No. 09/030,880 filed Feb. 26, 1998, now U.S. Pat. No. 6,008, 705), which shares common inventorship and a common assignee with the present application and is incorporated herein by reference.

BACKGROUND

1. Field of the Present Invention

The present invention generally relates to the field of communication systems and more particularly to a method and system for suppressing cross talk in a bidirectional bus.

2. History of Related Art

The various components in an electronic system typically communicate with each other using a multitude of conductive pathways or interconnects to provide communications or connectivity between the components. Frequently, the interconnects are organized into logical groups or busses which communicate related signals from one device to another. Typically, the busses are physically organized as a set of closely spaced, parallel interconnects.

The ongoing development of high-speed digital systems places increasing importance on signal integrity issues. As device speeds and integration levels increase with advances with semiconductor fabrication technology, multi-gigahertz communication bandwidths are expected at all levels of the interconnection hierarchy. Cross talk voltages in closely coupled communication busses are a major constraint in the design of high density busses whether on chip, on multi-chip modules, or on printed wiring boards. Delay can be reduced by increasing the characteristic impedance of the interconnects. Unfortunately, the ability to increase the characteristic impedance by, for example, increasing the thickness of an underlying dielectric layer is limited by other processing considerations. At some point, the ability to lower delay by manipulating the physical dimensions of the interconnect is offset by considerations of circuit density, cross talk, and bandwidth. Therefore, it would be advantageous to design an interconnect bus with inherent cross talk suppression. Such an approach is particularly suitable for "standard" interconnect circuit blocks such as processor-to-memory communication busses. It would be further desirable if the implemented communication bus did not significantly increase the number of I/Os, line pitch, or other important physical characteristics of the communication bus.

SUMMARY OF THE INVENTION

A bidirectional bus and data processing system suitable for suppressing cross talk noise are disclosed. The bidirectional bus includes a first interconnect line driven by a pair of drivers, a first pair of impedance elements connected between the first line and a second line of the bus, and a second pair of impedance elements connected between the first line and a third line of the bus. In one embodiment, each of the first pair of impedance elements comprises a NMOS/PMOS transistor pair where the drains of the transistor pair are connected to the second line and the sources of the transistor pair are connected to the first line. In one embodiment, the gate terminal of the NMOS transistor, in the transistor pair is connected to VDD and the gate terminal of the PMOS transistor is connected to ground. In one embodiment, the capacitive coupling per unit length between the first line and the second line is approximately equal to k and the impedance of the first pair of impedance elements is approximately equal to $(\upsilon k)^{-1}$, where $\upsilon$ is the speed of light through a dielectric in which the first and second lines are embedded. In one embodiment, the impedance of the first driver is approximately equal to $(\upsilon c_0)^{-1}$, where $c_0$ is the self-capacitance of the first line. The driver may comprise a CMOS inverter, where the input of the inverter is driven by a first input signal and the output of the inverter is connected to the first line. In one embodiment, the first driver is configured to draw current from the second and third lines when the first driver drives the first line. In one embodiment, the current drawn by the driver from the second and third lines offsets the current induced in the second and third lines when the first line is driven by the first driver. In one embodiment, the current in the first line is I when the first line is driven by the first driver and the current drawn from the second and third lines is J, where J/I is approximately equal to k/c where c is approximately $c_0+2k$. The current source may comprise a current sourcing transistor with its drain coupled to the second line, its source connected to a supply terminal, and its gate connected to the output of a reference voltage generator. In one embodiment, the current source may further include a pass transistor connected between the drain terminal of the current sourcing transistor and the second line, wherein the pass transistor is driven by the inverse of an input signal to the first driver circuit. The reference voltage generator may include an n-channel device with its source connected to the supply terminal and its gate and drain connected to a reference voltage node, an NMOS/PMOS transistor pair with its source terminals connected to the reference voltage node, its drain terminals connected to a first node, the gate of the PMOS transistor connected to the supply terminal, and the gate of the NMOS transistor connected to $V_{DD}$, and a pair of PMOS devices between VDD and the first node, where the gates of the PMOS devices are connected to their respective drains.

BRIEF DESCRIPTION OF THE DRAWINGS

Other objects and advantages of the invention will become apparent upon reading the following detailed description and upon reference to the accompanying drawings in which:

FIG. 3C is an equation describing the currents in a communication bus such as the bus of FIG. 2;

FIG. 4 is an equation for the capacitance matrix of the bus of FIGS. 2 and 3;

and FIG. 6 is a schematic of a driver circuit suitable for use in the system of FIG. 5.

Figure 1:
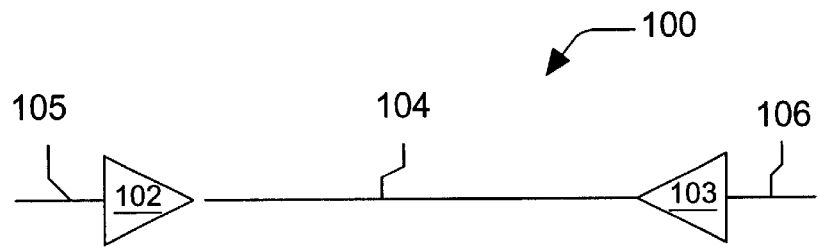
FIG. 1 is a simplified circuit diagram of a simultaneous voltage-mode bidirectional interconnect.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 2:
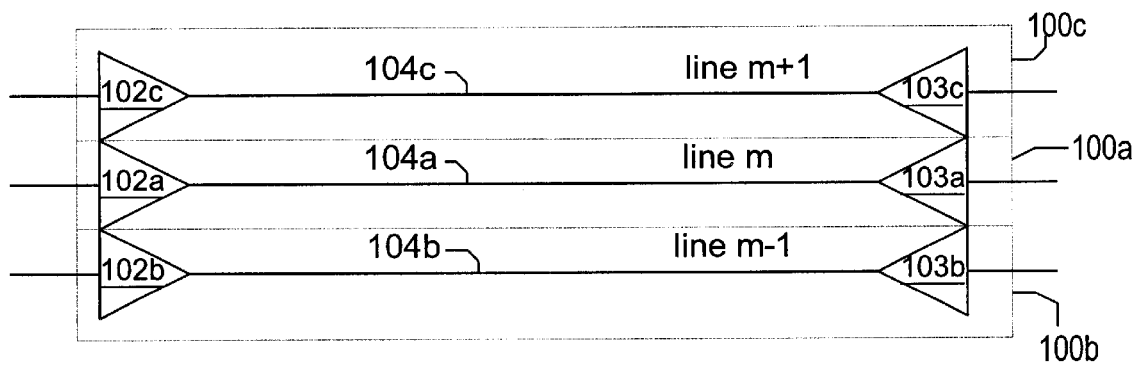
FIG. 2 is a partial circuit diagram of a simultaneous voltage-mode bidirectional bus.

Turning now to the drawings, FIG. 1 is a circuit diagram of a simultaneous voltage-mode bidirectional interconnect 100. Bidirectional voltage-mode interconnects allow data transmission, simultaneously in two directions over a single wire thereby doubling the effective bandwidth per wire over a point-to-point unidirectional scheme. In one embodiment, interconnect 100 includes a pair of drivers 102 and 103 configured to receive a corresponding pair of input signals 105 and 106. The outputs of drivers 102 and 103 are connected to line 104 and are adapted to drive line 104 to one of three states. If first driver 102 and second driver 103 both drive line 104 to a logical high, the voltage of line 104 is $V_{DD}$. If both drivers drive a logical low, the voltage of line 104 is 0 volts. If drivers 102 and 103 are in opposite states, the voltage of line 104 is midway (i.e., $V_{DD}/2$). By comparing the state of input 105 with the state of line 104, the ternary signal can be uniquely decoded. For a detailed description of this type of bidirectional interconnect, the reader is referred to R. Mooney, C. Dike, and S. Borkar, *A 900 Mb/s Bidirectional Signaling Scheme*, 1995 ISSCC Dig. of Tech. Papers, v. 30, p.38–39, (February 1995), which is incorporated by reference herein. Turning to FIG. 2, a schematic of a portion of a bidirectional bus 200 is depicted. Bidirectional bus 200 includes multiple instances of the bidirectional interconnect 100 described with respect to FIG. 1. In the illustration of FIG. 2, a set of three such interconnects 100a, 100b, and 100c are shown where interconnect 100a includes line "m" 104a and its corresponding drivers 102a and 103a, interconnect 100b includes line "m–1" 104b and its corresponding drivers 102b and 103b and interconnect 100c includes line "m+1" 104c and its corresponding drivers 102c and 103c. Thus, each interconnect 100 includes a pair of voltage mode drivers 102 and 103 that, in combination, control the voltage state of the corresponding line 104.

Figure 3A:
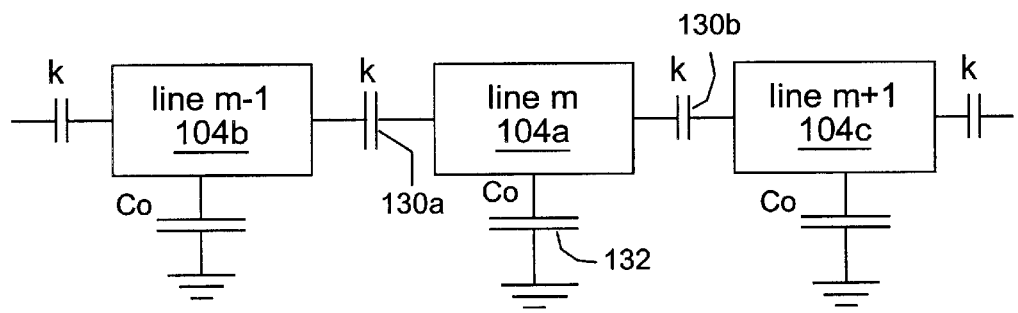
FIG. 3A is a representative cross-sectional view of the bus of FIG. 2.

Turning now to FIG. 3A, a conceptualized cross-sectional view of the portion of bus 200 depicted in FIG. 2 is presented. In this conceptualized illustration, capacitive coupling between the various lines 104 is indicated by the inclusion of capacitors 130 connecting each pair of adjacent lines. Line m 104a, for example, is capacitively coupled to line m+1 104c by capacitor 130a and to line m–1 104b by capacitor 130b. In the preferred embodiment, the line-to-line spacing of lines 104 in bus 200 is constant and the material properties of each line 104 and its surrounding dielectric layer are invariant. Under these assumptions, which are representative of conditions found in a standard communication bus such as a processor-to-memory bus, it will be appreciated that the capacitance of each coupling capacitor 130 is approximately equal. The capacitance per unit length of each coupling capacitor 130 is designated by the letter "k" in FIG. 3A. (For purposes of this disclosure, capacitive coupling between non-adjacent lines 104 is assumed to be negligible). In addition to coupling capacitors 130, each line 104 includes a self-capacitance, represented in FIG. 3A by reference numeral 132. The capacitance of each self-capacitor 132 is determined by such factors as the composition of line 104, the composition of the underlying dielectric, and the thickness of the dielectric layer. Presumably, these parameters do not vary significantly from line-to-line in a densely spaced communication bus and, therefore, each self-capacitor 132 is shown with a capacitance per unit length of $c_0$.

Turning now to FIG. 4, a capacitance matrix C for bus 200 is shown, where $c=c_0+2k$. The capacitance matrix C and the characteristic admittance matrix $Y_0$ for bus 200 are related by the equation:

$$Y_0 = (L/C)^{1/2} \qquad \text{(Eq. 1)}$$

where L represents the inductance matrix of bus 200 analogous to the capacitance matrix C. The characteristic admittance matrix $Y_0$ and its inverse, the characteristic impedance matrix $Z_0$, represent the equivalent matching impedance network that can terminate the coupled set of lines such that there are no reflections. Consider the case of a set of coupled lines embedded in a uniform dielectric medium such as a silicon-oxide composition. Under the transverse electromagnetic (TEM) wave assumptions that are valid for such interconnection systems, the LC product is determined only by the scalar quantity $v$ as follows:

$$LC = 1/v^2 \qquad \text{(Eq. 2)}$$

where $v$ is the speed of light in the dielectric medium. Solving Eq. 2 for L and substituting for L in Eq. 1 yields:

$$Y_0 = vC \qquad \text{(Eq. 3)}$$

Figure 3B:
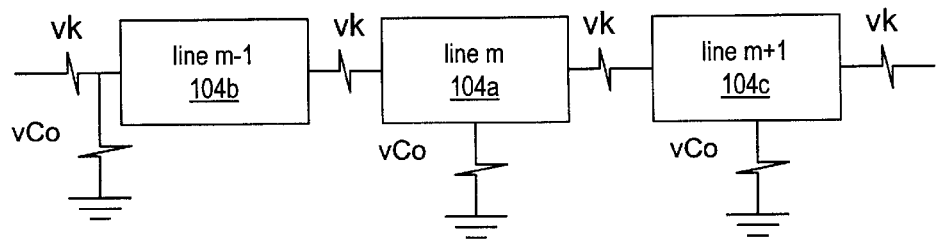
FIG. 3B is a cross-sectional view of the bus of FIG. 2 incorporating a matched impedance network.

Note that $v = (\mu_0 \epsilon_r \epsilon_0)^{-1/2} = v_0/\epsilon_r^{1/2}$ where $v_0$ is the speed of light in vacuum, $\mu_0$ is the permeability constant, $\epsilon_0$ is the permittivity constant, and $\epsilon_r$ is the relative permittivity of the dielectric. The impedance matching network corresponding to $Y_0$ is illustrated in FIG. 3B under the assumptions that only nearest neighbor interactions are appreciable, boundary effects are negligible, and the self and mutual capacitances are equal.

Matching the system of coupled transmission lines depicted in FIG. 2 is accomplished by designing each driver 102 with an impedance $r_D = (vc_0)^{-1}$ to match the self capacitance $c_0$ 132 and adding a resistance $r_m = (vk)^{-1}$ between the lines at both ends to match the inter-line capacitance 130. If a signal voltage $V_s$ is applied to line m 104a while all others lines are grounded, the described impedance network produces the currents indicated in the equation of FIG. 3C. When each driver drives a current I in its primary line and a current $J = (k/c)(vc_0)V_{DD}$ in its neighboring lines, the primary line experiences a voltage $V_s$ while all the neighboring line voltages are identically zero. In this embodiments The Norton equivalent circuit of each of driver 102 is a current source with $I = (vc_0)V_{DD}$ in parallel with a resistance $r_D$ with a resistance of $(vc_0)^{-1}$. The driver impedances $r_D$ and $r_m$ form the characteristic admittance $Y_0 = vC$ that matches both ends of the line. When one of the drivers (e.g., the $m^{th}$ driver) is high and the rest are low, the cross talk suppression condition results in the currents as indicated in FIG. 3c where $J = -(k/c)I$. The currents in the neighboring lines are just nulled by the inclusion of current sources to draw an offsetting current J from the neighboring lines. The ternary signal levels for the system are (0, $(c_0/c) V_{DD}/2$, $(c_0/c) V_{DD}$). By applying the superposition principle to combinations of active drivers, cross-talk is suppressed for all signals.

Figure 5:
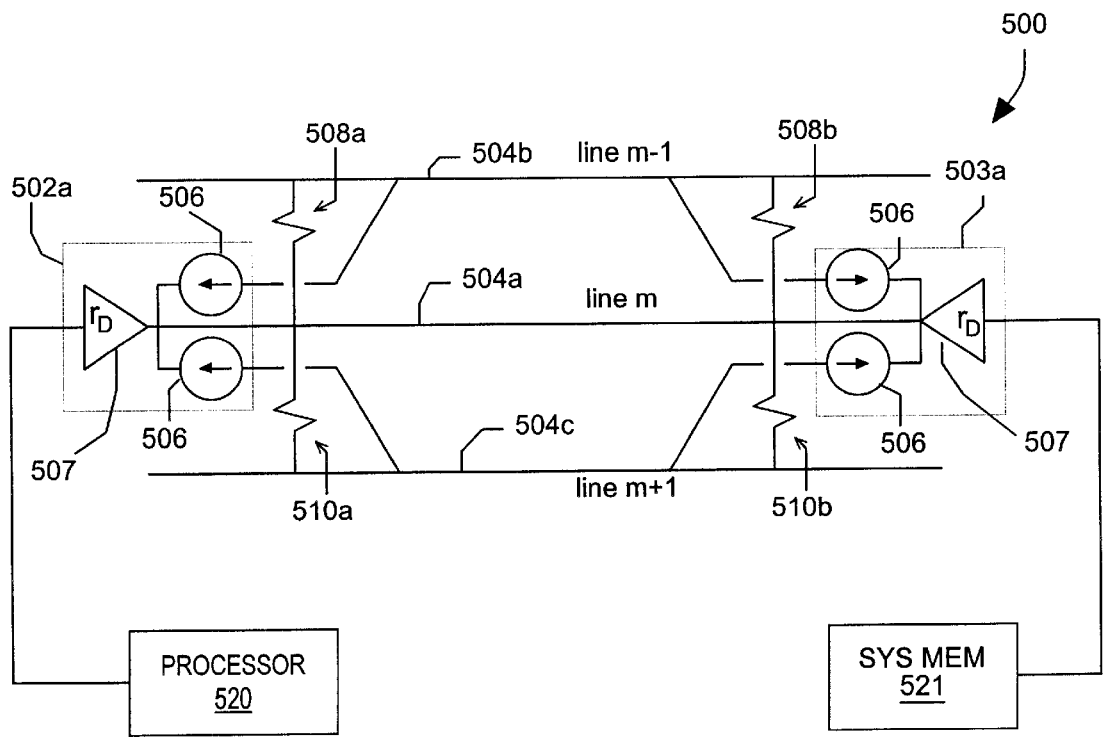
FIG. 5 is a schematic diagram of a communications system according to one embodiment of the present invention.

Turning now to FIG. 5, a schematic diagram of a portion of a data processing system including a communication bus 500 according to one embodiment of the present invention is presented. In one embodiment, communication bus 500 interconnects one or more processors 520 of the data processing system to a system memory 521. Bus 500 includes a set of lines 504 (three of which are indicated in FIG. 5 as lines 504a, 504b, and 504c). Each line 504 is driven by a pair of mixed mode drivers 502 and 503 (only the drivers 502a and 503a for line 504a are shown in FIG. 5). Each mixed mode driver 502 and 503 includes a voltage mode driver 507 with characteristic impedance of $r_D = (\upsilon c_0)^{-1}$. In addition, each mixed mode driver 502 and 503 includes a pair of current sources 506 that sink a current J from the neighboring lines 504 where J=−(k/c)I as described previously. In the depicted embodiment, bus 500 further incorporates a first pair of inter-line impedance elements 508a and 508b connected between line 504a and its neighboring line 504b and a second pair of line to line impedance elements 510a and 510b between line 504a and its neighboring line 504c. In the depicted embodiment, the impedance $r_m$ of the line-to-line impedance elements 508 and 510 is equal to $(\upsilon k)^{-1}$.

Turning now to FIG. 6, a diagram showing additional detail of one implementation of a mixed mode driver suitable for use as a driver 502 (or, equivalently, as a driver 503) in the bus 500 of FIG. 5 is depicted. The depicted embodiment of mixed mode driver 502 utilizes active components for each of the inter-line impedance elements 508 and 510 of FIG. 5. The inter-line impedance elements each comprise a transistor pair 603 that includes an n-channel device and a p-channel device. The gate of the n-channel device is connected to Vdd while the gate of the p-channel device is connected to ground. The drain terminals of both devices are connected to a neighboring line, such as line m+1 504c, while the source terminals of both devices are connected to line m 504a. An identical transistor pair 603 is shown connected between line m 504a and line m−1 504b. The voltage mode driver 507 of FIG. 5 is implemented in FIG. 6 as a CMOS inverter 605 that drives line m 504a. The inverter 605 is designed with an output impedance of $r_D = (\upsilon c_0)^{-1}$. The current sources 506 of FIG. 5 are achieved in the embodiment depicted in FIG. 6 by coupling neighboring lines m+1 504c and m−1 504b to the outputs of a pair of transistors 608a and 608b via a corresponding pair of pass transistors 604a and 604b. The pass transistors 604a and 604b are controlled by a digital control signal 607. In the depicted embodiment, control signal 607 is the logical inverse of the input signal 606, which drives the inverter 605. Transistors 608a and 608b are driven by a reference voltage $V_{ref}$. The reference voltage $V_{ref}$ is generated by a reference voltage generator 610. The source terminals of transistor 608a and 608b are connected to a reference supply voltage indicated as $-V_{ss}$, which is suitably in the range of approximately −1V. By biasing the gate terminals of transistors 608a and 608b to the reference voltage and the source terminals to a fixed voltage, it will be appreciated that transistors 608a and 608b are biased into a saturation condition in which they conduct an essentially fixed current value (over the range of voltages on lines m−1 504b and m+1 504c).

In one embodiment, reference voltage generator 610 includes an n-channel device 612, a transistor pair 614, and a pair of p-channel devices 616 and 618. The gate of the n-channel transistor 612 comprises the output $V_{ref}$ of reference voltage generator 610. The source terminal of n channel transistor 612 is connected to a low voltage supply indicated in FIG. 6 by $V_{SS}$. The drain of transistor 612 is tied to its gate terminal and to the source terminals of the transistor pair 614. The n-channel gate of transistor pair 614 is tied to $V_{DD}$ while the p-channel gate is tied to $V_{ss}$. The drain terminals of transistor pair 614 are connected to the gate and drain terminals of first p-channel transistor 616. The source terminal of first p-channel transistor 616 is connected to the gate and drain terminals of second p-channel transistor 618. The source terminal of second p-channel transistor 618 is connected to $V_{DD}$. In one embodiment, the $V_{SS}$ signal is maintained at −1 V to ensure that first n-channel device 612 is always on. The pair of p-channel devices are configured as two terminal devices that produce a 2 diode voltage drop from $V_{DD}$ to the drain terminals of transistor pair 614.

It will be appreciated by those skilled in the art having the benefit of this disclosure that a method in circuit for suppressing noise in a simultaneous bidirectional bus is presented. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A multiple line bus, comprising:
   a first line driven by a pair of drivers;
   a first pair of active impedance elements connected between the first line and a second line of the bus;
   a second pair of active impedance elements connected between the first line and a third line of the bus;
   further comprising a current source connected between a first driver of the pair of drivers and the second line, wherein the current source is configured to generate a current that offsets a current induced in the second line when the first driver drives the first line.

2. The bus of claim 1, wherein each of the first pair of impedance elements comprises a NMOS/PMOS transistor pair, wherein the drains of the transistor pair are connected to the second line and the sources of the transistor pair are connected to the first line.

3. The bus of claim 2, wherein the gate terminal of the NMOS transistor is connected to VDD and the gate terminal of the PMOS transistor is connected to ground.

4. The bus of claim 1, wherein the first and second lines are adjacent lines in the bus and the first and third lines are adjacent lines in a bidirectional bus.

5. The bus of claim 1, wherein a capacitive coupling per unit length between the first line and the second line is approximately equal to k and the impedance of the first pair of impedance elements is approximately equal to $(\upsilon k)^{-1}$, where $\upsilon$ is the speed of light through a dielectric in which the first and second lines are located.

6. The bus of claim 1, wherein the impedance of a first driver of the pair of drivers is approximately equal to $(\upsilon c_0)^{-1}$, wherein $c_0$ is the self-capacitance of the first line and $\upsilon$ is the speed of light through a dielectric in which the lines are embedded.

7. The bus of claim 1, wherein the each of the drivers comprises a CMOS inverter, wherein the input of each inverter is driven by a corresponding input signal and the output of the both inverters are connected to the first line such that the state of the first line is controlled by the combination of the driver inputs.

8. The bus of claim 1, wherein the first driver further includes a second current source connected between the driver and a third line.

9. The bus of claim 8, wherein the current in the first line is I when the first line is driven by the first driver and the current through the first and second current sources is J, wherein J/I is approximately equal to k/c where k is the capacitive coupling per unit length between the first and second lines and between the first and third lines, and c is approximately $c_0+2k$, where $c_0$ is the self-capacitance of the first line.

10. The bus of claim 1, wherein the current drawn by the current source from the second line is J when the current in the first line is I, wherein the wherein J/I is approximately equal to k/c where k is the capacitive coupling per unit length between the first and second lines, and c is approximately $c_0+2k$, where $c_0$ is the self-capacitance of the first line.

11. The bus of claim 1, wherein the current source comprises a current sourcing transistor with its drain coupled to the second line, its source connected to a supply terminal, and its gate connected to the output of a reference voltage generator.

12. The bus of claim 11, further comprising a pass transistor connected between the drain terminal of the current sourcing transistor and the second line, wherein the pass transistor is driven by the inverse of an input signal to the first driver circuit.

13. The bus of claim 11, wherein the reference voltage generator comprises an n-channel device with its source connected to the supply terminal and its gate and drain connected to a reference voltage node, an NMOS/PMOS transistor pair with its source terminals connected to the reference voltage node, its drain terminals connected to a first node, the gate of the PMOS transistor connected to the supply terminal, and the gate of the NMOS transistor connected to $V_{DD}$.

14. A bidirectional data bus for connecting a processor and a system memory of a data processing system, comprising:
    a first line driven by a pair of drivers;
    a first pair of impedance elements connected between the first line and a second line of the bus;
    a second pair of impedance elements connected between the first line and a third line of the bus;
    wherein the impedance of each of the drivers is approximately equal to $(\upsilon c_0)^{-1}$, wherein $c_0$ is the self-capacitance of the first line and $\upsilon$ is the speed of light through a dielectric in which the lines are embedded.

15. The data bus of claim wherein the capacitive coupling per unit length between the first line and the second line is approximately equal to k and the impedance of the first pair of impedance elements is approximately equal to $(\upsilon k)^{-1}$, where $\upsilon$ is the speed of light through a dielectric in which the first and second lines are located.

16. The data bus of claim 14, wherein the first driver is configured to draw current from the second and third lines when it drives the first line.

17. The data bus of claim 16, wherein the current drawn by the driver from the second and third lines offsets the current induced in the second and third lines when the first line is driven by the first driver.

18. The data bus of claim 17, wherein the current in the first line is I when the first line is driven by the first driver and the current drawn from the second and third lines is J, wherein J/I is approximately equal to k/c where k is the capacitive coupling per unit length between the first and second lines and between the first and third lines, and c is approximately $c_0+2k$, where $c_0$ is the self-capacitance of the first line.

19. A method suppressing cross talk in a bidirectional bus, comprising:
    driving a first line of the bus with a first signal by a first driver wherein the first driver produces a current I in the first line; and, responsive thereto:
    drawing a current J from a second line adjacent to the first line with a current source, wherein J/I is approximately equal to k/c, k is the capacitive coupling per unit length between the first and second lines, and c is approximately $c_0+2k$, where $c_0$ is the self-capacitance of the first line; and
    terminating the first line with an impedance element between the first and second lines, wherein the impedance of the impedance element is approximately equal to $(\upsilon k)^{-1}$ wherein k is the capacitive coupling per unit length between the first and second lines and $\upsilon$ is the speed of light in a dielectric in which the first and second lines are located.

20. The method of claim 19, wherein rein driving the first line comprises driving a CMOS inverter with a first input signal.

21. The method of claim 19, wherein drawing the current J from the second line includes generating a reference voltage at the gate of a current sourcing transistor coupled to the second line.

22. The method of claim 19, wherein the impedance element comprises an NMOS/PMOS transistor pair, wherein the drains of the transistor pair are connected to the second line and the sources of the transistor pair are connected to the first line.

* * * * *

UNITED STATES PATENT AND TRADEMARK OFFICE
CERTIFICATE OF CORRECTION

PATENT NO. : 6,661,303 B1
DATED : December 9, 2003
INVENTOR(S) : Uttam Shyamalindu Ghoshal It is certified that error appears in the above-identified patent and that said Letters Patent is hereby corrected as shown below:

Column 4,
Line 13, equation "$Y_O=(L/C)^{1/2}$" should read -- $Y_O=(L/C)^{-1/2}$ --

Column 7,
Line 44, claim 15 should read:
   15. The data bus of claim 15, wherein the capactive coupling per unit length between the first line and the second line is approximately equal to k and the impendance of the first pair of impedance elements is approximately equal to $(\upsilon k)^{-1}$, where $\upsilon$ is the speed of light through a dielectric in which the first and second lines are located.

Column 8,
Line 36, claim 20 should read:
   20. The method of claim 19, wherein driving the first line comprises driving a CMOS inverter with a first input signal.

Signed and Sealed this

Sixth Day of July, 2004

JON W. DUDAS
*Acting Director of the United States Patent and Trademark Office*